A. R. HAVENER.
LACING STUD SETTING MACHINE WITH AUTOMATIC STOP.
APPLICATION FILED NOV. 23, 1918.

1,379,303. Patented May 24, 1921.
6 SHEETS—SHEET 3.

Inventor:
Arthur R. Havener,
By his attorney,
Charles N. Gooding.

A. R. HAVENER.
LACING STUD SETTING MACHINE WITH AUTOMATIC STOP.
APPLICATION FILED NOV. 23, 1918.

1,379,303.

Patented May 24, 1921.
6 SHEETS—SHEET 4.

Inventor:
Arthur R. Havener,
by his attorney, Charles V. Gooding.

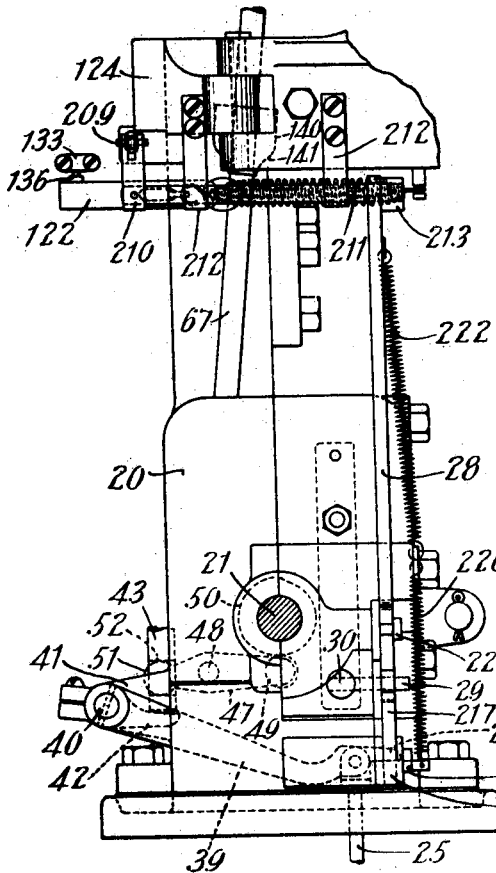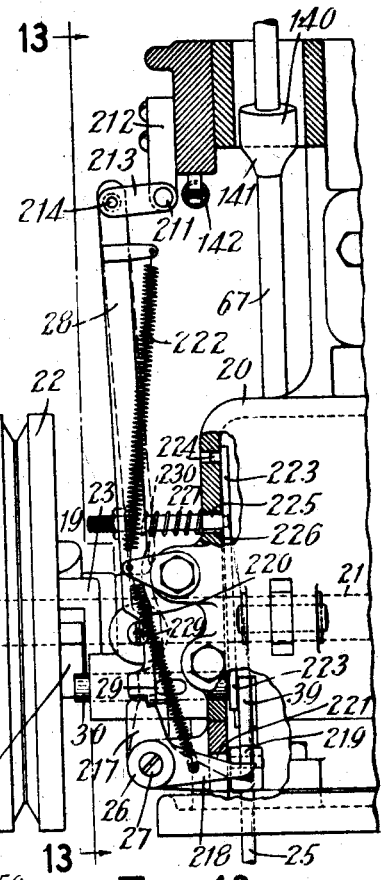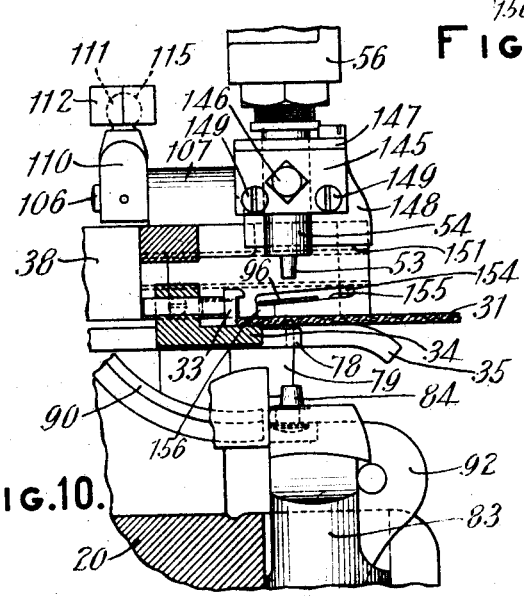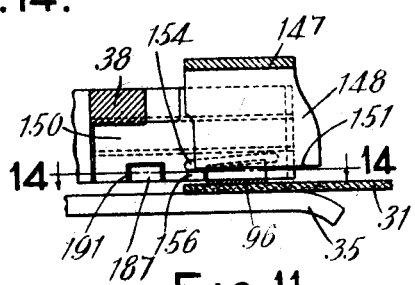

A. R. HAVENER.
LACING STUD SETTING MACHINE WITH AUTOMATIC STOP.
APPLICATION FILED NOV. 23, 1918.

1,379,303.

Patented May 24, 1921.
6 SHEETS—SHEET 6.

Inventor:
Arthur R. Havener,
by his attorney,
Charles N. Fording.

UNITED STATES PATENT OFFICE.

ARTHUR R. HAVENER, OF WAYLAND, MASSACHUSETTS, ASSIGNOR TO AMERICAN LACING HOOK CO., A CORPORATION OF NEW JERSEY.

LACING-STUD-SETTING MACHINE WITH AUTOMATIC STOP.

1,379,303.   Specification of Letters Patent.   Patented May 24, 1921.

Application filed November 23, 1918. Serial No. 263,833.

*To all whom it may concern:*

Be it known that I, ARTHUR R. HAVENER, a citizen of the United States, residing at Wayland, in the county of Middlesex and State of Massachusetts, have invented new and useful Improvements in Lacing-Stud-Setting Machines with Automatic Stops, of which the following is a specification.

This invention relates to a machine for setting lacing hooks or the like in the upper of a boot or shoe and automatically stopping said machine after a predetermined number of lacing hooks have been set in said upper.

It is the object of this invention to provide a mechanism capable of performing, with slight adjustments, any of the following operations:

1st. To automatically set a predetermined number of lacing hooks in the upper of a boot or shoe and in a reinforcing strip therefor and after the predetermined number of lacing hooks has been set to sever that portion of the reinforcing strip which is attached to the upper by the lacing hooks from the rest of the strip and then automatically stop the machine.

2nd. To automatically set a predetermined number of lacing hooks in the upper of a boot or shoe and in a reinforcing strip therefor, to partially sever or slit the reinforcing strip between adjacent lacing hooks so that the portion of the reinforcing strip attached to the upper may assume a curve corresponding to the edge of the upper without having any tendency to buckle or wrinkle either the strip or the upper to which it is attached and at the end of the predetermined number of lacing hook setting operations to entirely sever that portion of the reinforcing strip which is attached to the upper by the lacing hooks from the rest of the strip and then automatically stop the machine.

3d. To automatically set a predetermined number of lacing hooks in the upper of a boot or shoe and in a reinforcing strip, to entirely sever the reinforcing strip between adjacent lacing hooks and to feed the upper a different distance from the distance which the strip is fed, whereby a saving in the amount of tape used is effected.

4th. To automatically set a predetermined number of lacing hooks in the upper of a boot or shoe and in a reinforcing strip, to entirely sever the reinforcing strip between adjacent lacing hooks, to feed the upper a different distance from the distance which the strip is fed and then automatically stop the machine, whereby a saving in the amount of tape used is effected.

5th. To attach a predetermined number of lacing hooks to the upper of a boot or shoe and to then automatically stop the machine.

The mechanisms for setting lacing hooks and for feeding and cutting the reinforcing strip, whether partially or entirely, are substantially the same as like mechanisms embodied in an application for Letters Patent filed by me February 1, 1917, Serial No. 146,005, since matured in Patent 1,327,911, January 13, 1920, but in this application the additional feature is incorporated of automatically stopping the machine at the end of the setting of a predetermined number of lacing hooks and also after a piece of reinforcing material which is attached to the upper by one or more lacing hooks has been cut from a strip of the same. The machine of this invention is also adapted as hereinafter described by a change in one of the cutters to entirely sever the reinforcing strip between adjacent lacing hooks and to attach said severed sections to the shoe upper by said lacing hooks.

For a complete description and illustration of the mechanism which sets the lacing hooks in the upper and feeds the upper by means of said lacing hooks, reference may be had to Letters Patent of the United States No. 977,090 which were issued to me November 29, 1910.

While the mechanism hereinafter described is particularly adapted to set lacing hooks, it will be evident that the invention in its broader features applies equally well to mechanisms for setting eyelets and, therefore, in the claims the term "lacing stud" is understood to mean either lacing hooks or eyelets.

The invention consists in the combination and arrangement of parts set forth in the following specification and particularly pointed out in the claims thereof.

Referring to the drawings:

Fig. 10 is a sectional elevation taken on line 10—10 of Fig. 2, looking toward the right, illustrating the punch in its uppermost position, the lacing hook carrier plate in its lowermost position and the cutters positioned relatively to each other to partially sever the reinforcing strip.

Fig. 11 is a detail view of the cutters positioned relatively to each other to entirely sever the reinforcing strip, said cutters being shown in the positions they occupy at the termination of the cutting operation.

Fig. 12 is a side elevation partly broken away and shown in section illustrating a portion of the mechanism which operates the clutch to automatically stop the machine.

Fig. 13 is a transverse section taken on line 13—13 of Fig. 12 looking toward the right in said figure and presenting a rear elevation of the parts illustrated in Fig. 12.

Fig. 14 is a detail section of the secondary cutter taken on line 14—14 of Fig. 11.

Figure 1:
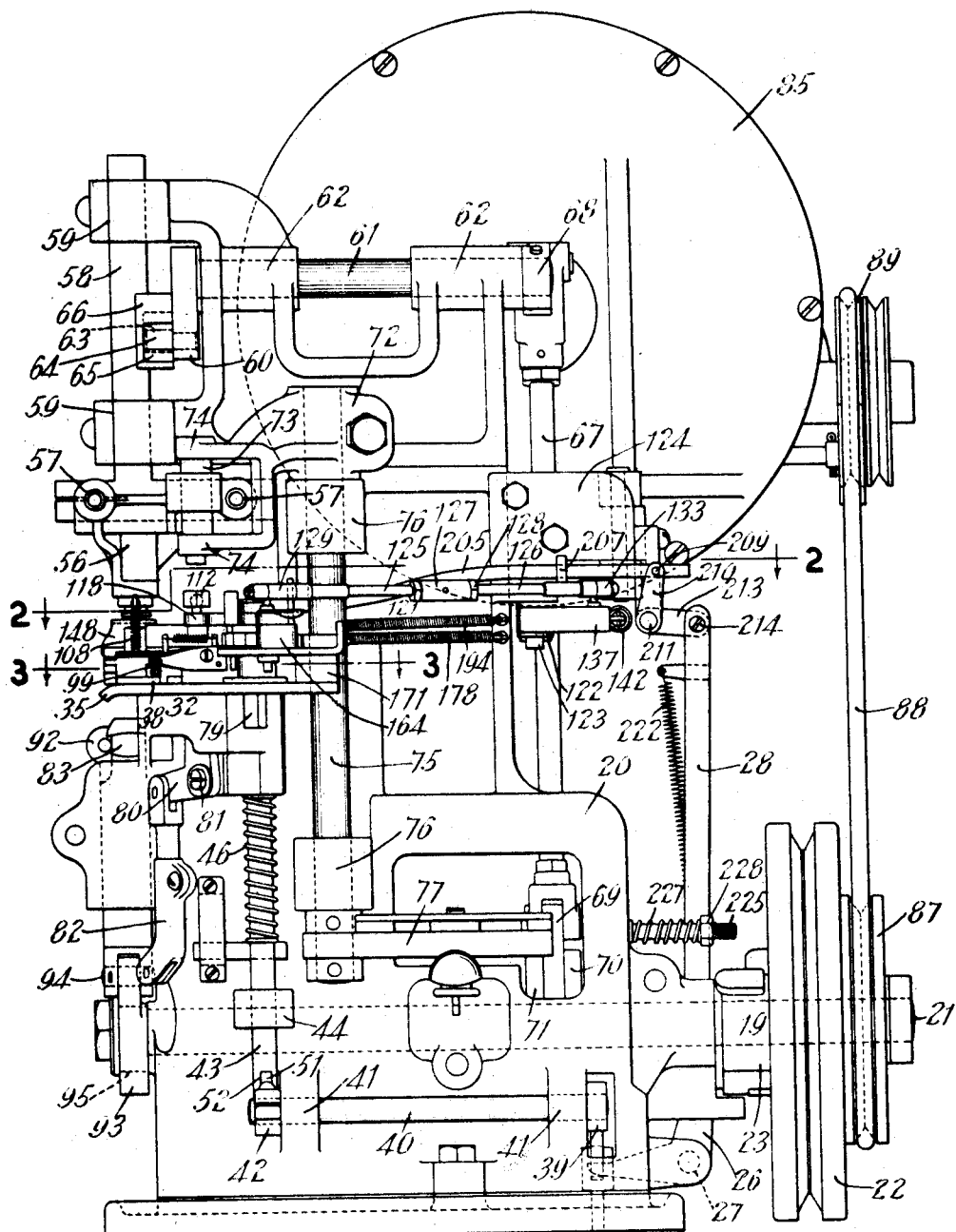
Figure 1 is a right hand side elevation of my improved lacing hook setting machine.

Like numerals refer to like parts throughout the several views of the drawings. Referring to Figs. 1 to 17 inclusive of the drawings, 20 is the frame of the machine and 21 the main driving cam shaft which is driven by means of a clutch 19, said clutch comprising a clutch pulley 22, constituting a driving member, which rotates loosely upon the driving shaft 21 until locked by a locking dog 24 to a clutch member 23 which is fast to said shaft 21 and constitutes a driven member. The clutch 19 is operated to start the machine by a rod 25 connected to a suitable treadle (not shown in the drawings), said treadle being moved to lower the rod 25 and thereby rock a lever 26 pivoted at 27 to the frame of the machine and, through an arm 28 and pin 29, operates a spring actuated tripper slide 30 which, when withdrawn from in front of the locking dog 24, will allow said locking dog to engage the driving pulley 22, whereupon said driving member 22 and said driven member 23 will be locked together in a manner well known to those skilled in this art. It will be seen that the pin 29 forms, in effect, a portion of the tripper slide 30. The novel features of this invention whereby the driving member 22 and driven member 23 are automatically disengaged to stop the machine will be hereinafter fully described.

The upper 31 of a shoe is placed upon a work-support 32 by the operator, with the edge of the upper resting against an edge gage 33. Said work-support is made in two parts 34 and 35 between which is located a portion of the lacing hook feeding mechanism.

Figure 3:
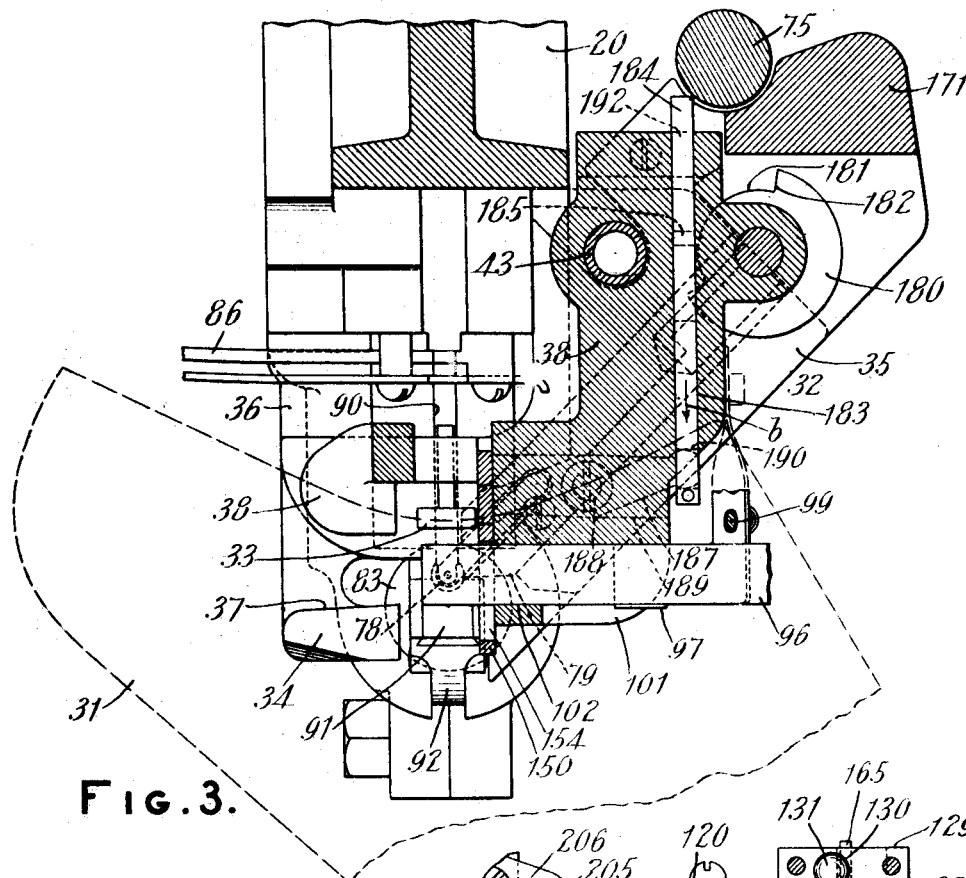
Fig. 3 is a detail section taken on line 3—3 of Fig. 1 illustrating the mechanism for automatically moving the secondary cutter transversely of the primary cutter.

The part 34 is formed integral with a bracket 36 fast to the frame 20 and has a slot 37 extending along the top thereof through which the lacing hooks pass as the upper is fed forward after the setting operation has taken place (see Fig. 3).

The part 35 of the work-support is a plate which is screwed to the frame and abuts against the upper portion of the part 34 forming a flat surface upon which the upper is placed.

The upper is clamped to the work-support by means of a presser foot 38 which can be raised by foot power from the treadle or automatically by power from the main driving shaft. When operated by the treadle, as, for example, when the upper is inserted beneath the presser foot upon the work-support, and again when it is removed therefrom, the rod 25 is pushed upwardly, thereby rocking an arm 39 which is fastened to a rock-shaft 40. The rock-shaft 40 is journaled to rock in bearings 41 on the right hand side of the frame (see Fig. 1).

Adjustably fastened to the front end of the rock-shaft 40 is an arm 42, the free end of which bears against the bottom of a rod 43 adapted to slide vertically in bearings 44 on the right hand side of the frame 20. The presser foot 38 is adjustably fastened to the rod 43 by a screw 45. A spring 46 presses the rod 43 downwardly.

When the presser foot is operated automatically by power from the main driving shaft 21, as, for example, when the upper 31 is released to allow the punch to feed it forward into position to receive a new hook the operation is as follows: A lever 47 is pivoted at 48 to the frame 20 and has mounted thereon a cam roll 49 which bears against the periphery of a cam 50 fast to the main driving shaft 21 (Fig. 13). The other end 51 of the lever 47 projects through a slot 52 in the frame 20 and into a slot 52 in the rod 43. It will thus be seen that at the proper time the cam 50 will rock the lever 47, raising the rod 43 against the action of the spring 46, and raise the presser foot to release the upper.

Figures 8, 9:
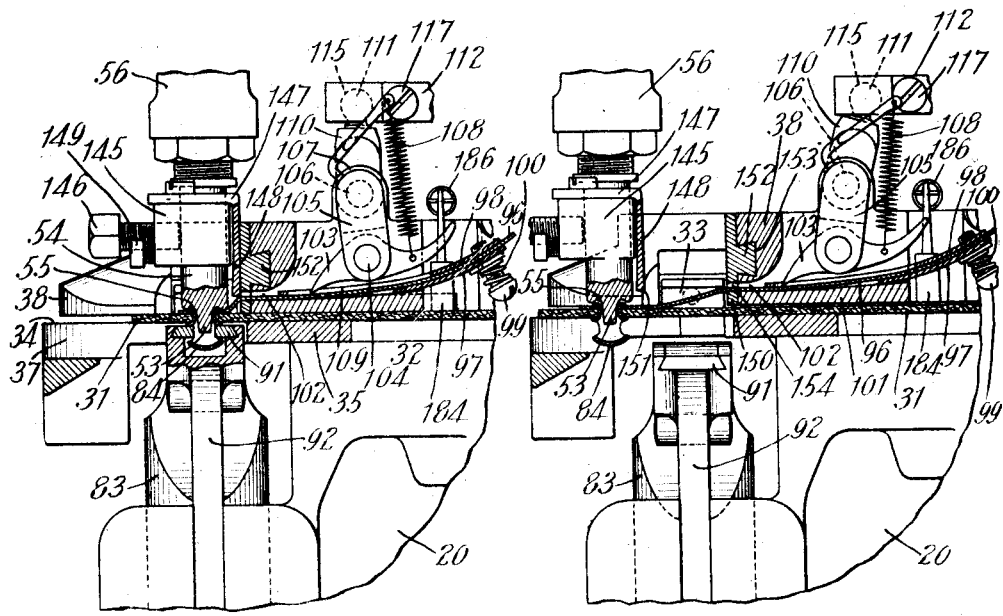
Fig. 8 is a sectional elevation taken on line 8—8 of Fig. 2 looking toward the rear and illustrating the hook setting instrumentalities at the termination of the setting operation, the cutters in position to partially sever the strip during the upward movement of the presser foot prior to the feeding of the upper and the mechanism for giving the strip its initial feeding movement.
Fig. 9 is a sectional elevation similar to Fig. 8 with the various parts in the positions they assume at the termination of the lateral movement of the punch which simultaneously feeds the upper and reinforcing strip.
Figure 15:
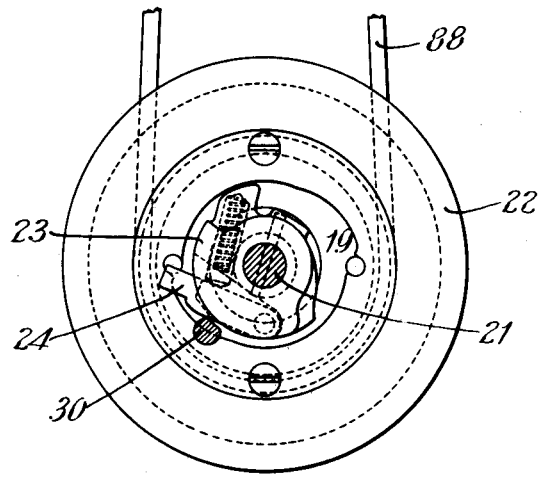
Fig. 15 is a sectional elevation taken on line 13—13 of Fig. 12, looking toward the left in said figure.

The mechanism for operating the punch and die, feeding the lacing hooks into position, inserting them in the upper and feeding the upper a predetermined distance in order to have the operation repeated have all been the subject of a prior patent, viz., Patent No. 977,090, as previously stated, and it is not thought that it is necessary to give a complete detailed description of the same. Briefly described, however, said mechanism is as follows: Referring to Figs. 1 and 8, the punch proper 53 is formed upon the lower end of a stud 54 which has a shoulder or annular clenching projection 55 thereon, constituting an anvil against which the shank of the lacing hook strikes to clench the same during the setting operation. The stud 54 is screw-threaded to engage a slide 56, constituting a punch holder, guided to slide laterally of the punch upon tubes 57 which are fastened to a plunger 58 arranged to slide vertically in bearings 59 in the frame 20.

A vertical reciprocatory motion is imparted to the plunger 58 by a crank-arm 60 fast to the end of a rock-shaft 61 journaled to rock in bearings 62 in the frame 20. The crank-arm 60 has a crank-pin 63 thereon which projects into a sliding block 64 located in a segmental slot 65 provided in a block 66 fast to the plunger 58. A rocking motion is imparted to the shaft 61 by means of a link 67 pivotally connected at its upper end to an arm 68 fast to the shaft 61, and pivotally connected at its lower end to a cam lever 69 which is rocked upwardly and downwardly at the proper time by cams 70 and 71 which are fast to the main driving shaft 21. The link 67 is also utilized to operate the mechanism for feeding the reinforcing strip, which will be described later.

A lateral movement is imparted to the punch 53 as follows: The punch holder 56 is arranged to slide, as hereinbefore set forth, upon the tubes 57 and a sliding movement is imparted thereto by means of an arm 72 which is connected to said punch holder 56 by a pin 73 upon which the punch holder is slidable vertically between the ears 74 forming a part of the arm 72. The arm 72 is adjustably fastened to a rock-shaft 75 arranged to rock in bearings 76 on the frame 20. An arm 77 is fastened to the rock-shaft 75 at its lower end and said arm 77 is connected through suitable mechanism (not shown) to a cam slide adapted to be reciprocated by suitable cams fast to the main driving shaft 21.

It will thus be seen that a vertical reciprocatory motion is imparted to the punch holder and the punch and anvil thereon are raised and lowered at the proper time to punch the material and assist in the setting of the lacing hook in the material. Also a lateral movement is imparted to the punch holder whereby the punch will feed the upper while the punch is inserted in a lacing hook shank after the setting operation and then move said punch back after it has been disengaged from the lacing hook into position to repeat the operation upon another hook.

A die plate 78 (Figs. 3 and 10) coöperates with the punch 53 to punch a hole through the material and is fastened to a slide 79 adapted to slide in ways in the frame 20. A reciprocatory motion is imparted to said slide 79 by a lever 80 Fig. 1, pivoted at 81 to the frame 20. The lever 80 is connected by a link 82 to a lacing hook carrier slide 83. Thus it will be seen that as the lacing hook carrier slide is reciprocated, as hereinafter described, the link 82 will impart a rocking movement to the lever 80 and thus a reciprocatory movement will be imparted to the slide 79 and to the die plate 78 fast thereto, whereby the die plate may be moved into and out of alinement with the punch at the proper time.

The lacing hooks 84 are placed in mass in a hopper 85 and are fed from said hopper onto a raceway 86 by suitable mechanism within the hopper which is driven by a pulley 87 fast to the clutch pulley 22 and connected by a belt 88 to a pulley 89 mounted on the hopper 85. The raceway 86 guides the lacing hooks in a manner well known to those skilled in the art downwardly from the hopper 85 to an auxiliary raceway 90 down which they are fed one at a time by suitable mechanism, not shown in the drawings but fully illustrated and described in the before mentioned Patent No. 977,090, and pushed onto a lacing hook carrier plate 91 as illustrated in Fig. 10 when said lacing hook carrier plate is in alinement with the lower end of the auxiliary raceway 90.

The lacing hook carrier plate 91 is fastened to the upper end of a lever 92 which is pivoted in the slide 83 in such a manner that at the completion of the setting operation the plate 91 may be disengaged from the lacing hook.

The slide 83 has a vertical reciprocatory motion imparted thereto by a lever 93 to which it is connected by a pin 94 (Fig. 1). The lever 93 is rocked at the proper time by a cam 95 fast to the main driving shaft 21 to raise the slide 83 and force the shank of the lacing hook 84 through the material against the anvil to clench the hook securely to the material as clearly illustrated in Fig. 8.

The mechanism for feeding a reinforcing strip for the upper 31 to be fastened thereto by the lacing hooks partially severed between the lacing hooks in order that said strip may assume a curve corresponding to the edge of the upper without wrinkling and finally entirely severing said strip is as follows:

The reinforcing strip 96, coiled in a roll upon a suitable reel not shown, is directed to the initial feeding mechanism with its inside surface, as it is wound upon the roll, facing down, said reinforcing strip being directed to said initial feeding mechanism over a curved guide 97 fast to the presser foot 38 and beneath a curved cover plate 98 upon said guide, see Figs. 8 and 9.

A screw 99, around which is wound a spiral spring 100, extends through a hole in the guide 97 and has screw threaded engagement with the cover plate 98, thereby placing a tension upon the reinforcing strip 96 which may be varied by turning the screw 99 as desired. After passing over the curved guide 97, the reinforcing strip is directed across a shelf 101 and through an opening 102 formed in the presser foot 38, the cover plate 98 also acting to hold the reinforcing strip against the upper surface of the shelf 101.

By directing the reinforcing strip 96 over the curved guide 97 beneath the curved cover plate 98, the reinforcing strip will be bent in a reverse direction to that in which it was bent while coiled in the roll and thereby offset the tendency of the strip to curl, especially as the roll becomes diminished.

A finger 103 is pivoted upon a pin 104 in a forked arm 105, said arm being adapted to rock with a stud 106 in a bearing 107 formed upon the presser foot 38. The finger 103 has a pointed end which is always held in engagement with the reinforcing strip 96 by a spring 108, said point engaging the reinforcing strip 96 through an opening 109 in the cover plate 98 and piercing said reinforcing strip when the finger 103 is rocked in the proper direction and giving to the strip its initial feeding movement.

Fast to the stud 106 is another arm 110 which has a spherical end 111. A link 112 connects the arm 110 with a pin 113 which is fast in the arm 118 of a lever 119. The pin 113 has a spherical end 114. The link 112 is constructed in two parts which are recessed at 115 and 116 to fit the spherical ends 111 and 114 of the arms 110 and 113 respectively, see Fig. 2. Screws 117 fasten the two parts of the link 112 together upon the arm 110 and the pin 113 and thereby form a universal coupling between the arm 110 and the lever 119.

The lever 119 is pivoted upon a vertical stud 120 which is mounted in the presser foot 38 and is rocked upon said stud 120 by motion transmitted by a rod 121 connected to a bell crank lever 122 pivoted at 123 to a bracket 124 fast to the frame 20. The connecting rod 121 is constructed in two sections 125 and 126 which are adapted to be adjusted relatively to each other to increase or diminish the length of the rod by means of a turn buckle 127 and coöperating lock nuts 128. The rod 121 is connected at one end to the lever 119 by means of a clamping member 129 having a recess 130 adapted to fit the spherical head 131 of a pin 132 fast to the lever 119, and the other end of said rod is similarly fastened to the bell crank lever 122 by the clamping member 133 having a recess 134 which fits the spherical head 135 of a pin 136 which is fastened in an arm 137 of said bell crank lever 122.

It will thus be seen that the rod 121 makes a universal connection between the levers 119 and 122 to allow for the horizontal movement of said levers and for the vertical movement of the presser foot 38. The other arm 138 of the lever 122 has journaled thereon a cam roll 139 which engages a cam 140 fast to the link 67. The upper portion of the cam 140 is cylindrical, while the lower portion 141 is substantially conical, see Fig. 12.

A spring 142 keeps the roll 139 in engagement with either the cam 140 or the link 67.

Figure 2:
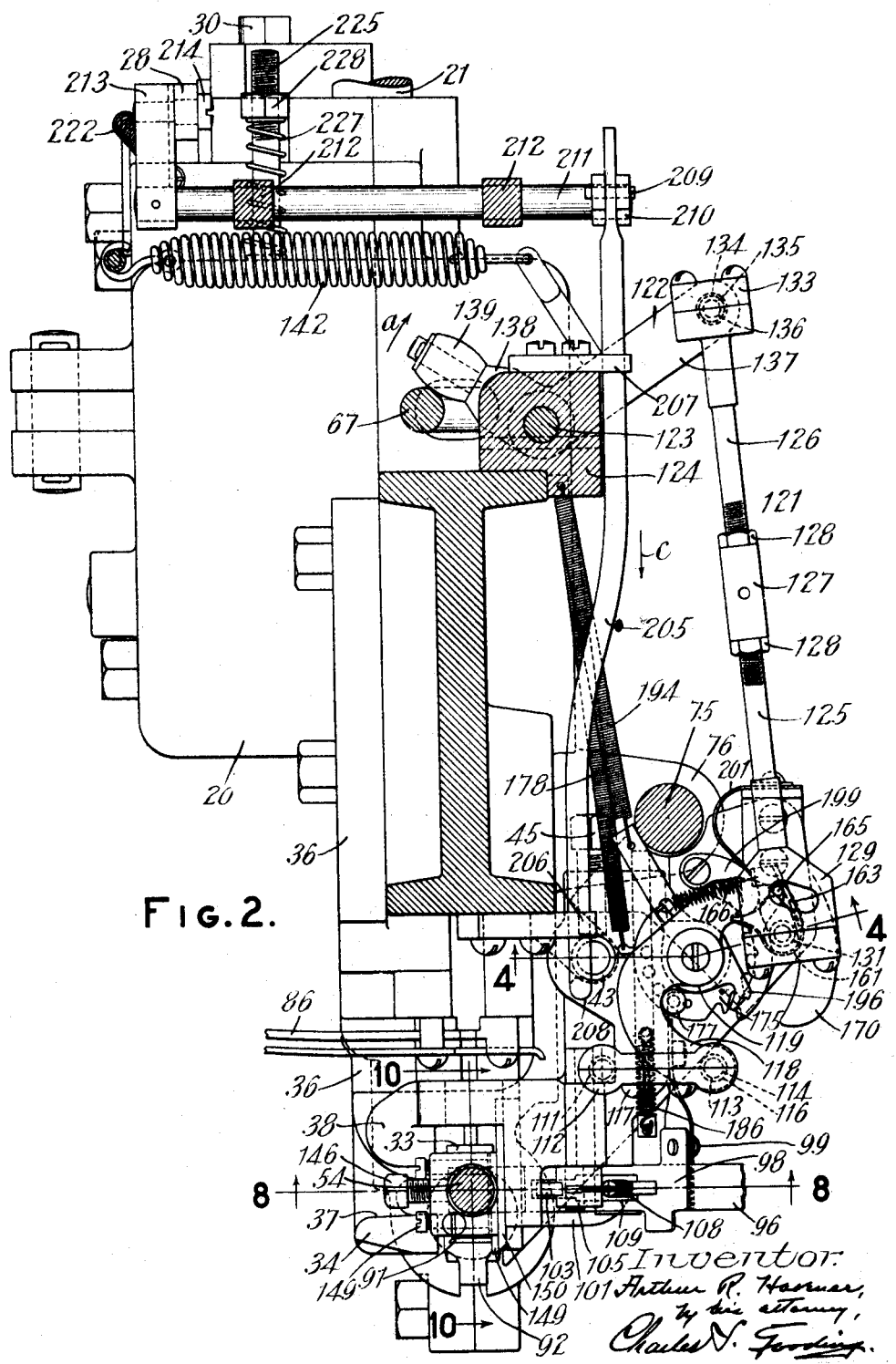
Fig. 2 is a detail plan, partly in section, taken on line 2—2 of Fig. 1, illustrating the mechanism for giving the reinforcing strip its initial feeding movement, the cutters for partially severing said reinforcing strip, the mechanism for operating said cutters to subsequently entirely sever said strip and the mechanism connecting with the clutch to automatically stop the machine.

Thus it will be seen that with each downward movement of the link 67 the cam 140 will descend and the cam roll 139, which has been engaging said link 67, as illustrated in Fig. 2, will engage the substantially conical portion 141 of the cam 140 and cause the lever 122 to rock in the direction of the arrow a, Fig. 2, and thus through the mechanism just described cause the finger 103 to move backward or to the right, Fig. 9.

Upon the last upward movement of the link 67 and subsequent to the complete severing of the strip after the final lacing hook has been inserted through said strip and upper, the movement of the strip feeding mechanism will be reversed and the finger 103 will pierce the strip and push said strip forward into position to receive the first lacing hook in the next upper.

Figure 5:
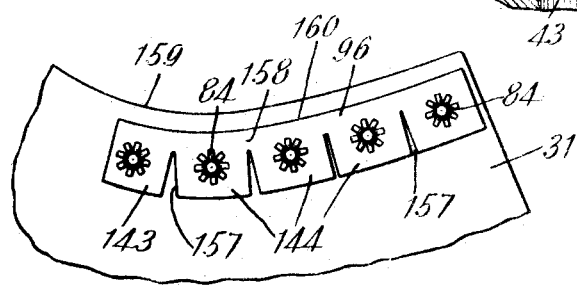
Fig. 5 is a view of a portion of the inner side of a shoe upper showing the strip partially severed at intervals and acting as a reinforcement for the upper to which it has been attached.

It should be understood that the mechanism just described is only for giving to the reinforcing strip its initial feeding movement for that portion of the strip which receives the first lacing hook and which is clearly illustrated at 143 in Figs. 5, 8 and 9. The succeeding portions 144 are all fed forward by the lateral movement given to the punch 53, as illustrated in Fig. 9.

By referring to Fig. 5, it will be seen that the partially severed portion 143 is much shorter than the succeeding partially severed portions 144 and at the same time the lacing hooks are evenly spaced. The length of the initial feed of the reinforcing strip is so regulated that it will always be shorter than the succeeding feeds given by the punch, even when the lacing hooks are given their shortest spacing thus saving a waste of the strip. The length of the portion 143 will always remain constant while the length of the portions 144 will vary according to the spacing of the hooks.

With these points in mind, it will be seen that after the initial feeding movement is given to the reinforcing strip and after the insertion of the first lacing hook, the mechanism which causes said movement, while always in operation, is not performing any work, because the length of the strip that is being fed beneath the point of the finger 103 by the punch 53 is longer than the distance traveled by the point of the finger 103, and although the finger 103 is traveling in the same direction simultaneously with the forward movement of the strip, it is not traveling as fast as the strip and the strip is sliding under the point of the finger.

The guide 97 not only acts to direct the reinforcing strip 96 to the cutters but also, with assistance of the spring actuated cover plate 98, engages the reinforcing strip with sufficient pressure to prevent any withdrawal of said strip during the rearward movement of the finger 103.

The mechanism which partially severs the reinforcing strip between the lacing hooks is as follows (see Figs. 8, 9 and 10):

A block 145 is adjustably fastened upon the stud 54, which forms a part of the punching mechanism, by a screw 146. Upon this block 145 is fastened a primary cutter 147 which has a cutting blade 148 which is formed at right angles to the body portion of the cutter. Screws 149 in the block 145 bear against the cutting blade and are adapted to adjust said cutting blade relatively to another cutter 150 which is mounted upon the presser foot 38. The primary cutter 147 moves upwardly and downwardly simultaneously with the punch 53, and when the punch is in its lowermost position, as illustrated in Fig. 8, during which time the lacing hook is being inserted in the material, the cutting edge 151 of the primary cutter will just contact with the reinforcing strip 96 but will not cut the same.

The cutter 150 which constitutes the secondary cutter is mounted in the presser foot 38 and is raised and lowered simultaneously therewith. Said cutter 150 is also arranged to slide horizontally in said presser foot, the cutter having formed integral therewith a dovetailed portion 152 which fits a similar groove 153 formed in the presser foot, Figs. 3, 8 and 9.

A slot 154 is formed in the secondary cutter 150 and the lower edge of this slot has an inclined cutting edge 155 over which the reinforcing strip 96 is guided and upon which it rests while being cut. The cutter 150 also has a vertical groove 156 in its front face, Fig. 14. Upon the completion of the setting operation illustrated in Fig. 8, the presser foot 38 is automatically raised, as hereinbefore described, to release the upper to allow the punch to feed the upper forward. At this time, due to the groove 156 being positioned beneath the reinforcing strip 96, the cutting edge 155 extends only part way across said strip or approximately the length of one of the slits 157, Fig. 5. Said upward movement of the presser foot is enough to cause the reinforcing strip to be severed a portion of its width, as illustrated at 157, Fig. 5, and leaves a portion 158 uncut along the side of the reinforcing strip nearest the edge 159 of the shoe upper.

As the upper is then fed forward by the punch to the position illustrated in Fig. 9, the unsevered portion of the reinforcing strip will pull with it an amount of strip equal to the length of the feed given the upper, and this will be repeated after each setting operation until a predetermined number of hooks have been inserted, when the strip will be entirely severed, as hereinafter described.

As the upper is fed forward, the operator keeps the edge 159 of the upper 31 against the gage 33, and as said edge 159 of nearly every upper is curved for a portion of its length at least, the edge 160 of the reinforcing strip 96 will easily conform with the curve 159 of the upper without wrinkling said reinforcing strip, the slits 157 spreading more or less according to the curvature of the upper, as illustrated in Fig. 5.

The mechanism which causes the reinforcing strip to be entirely severed after a predetermined number of lacing hooks have been fastened in the upper is as follows (see Figs. 2, 3, 4, 6, 7 and 16).

The lever 119, which is adapted to be rocked upon the stud 120, as previously described, has formed integral therewith an arm 161. This arm 161 has fast therein the pin 132 previously referred to, said pin having a portion 162 extending downwardly into a pawl 164 which has projecting therefrom a pin 165 which is engaged by a lever 163 pivoted upon the portion 162 of the pin 132.

A spring 166 connected to the lever 163 always tends to keep said lever in engagement with the pin 165. The pawl 164 has a cylindrical stem 167 projecting from its lower side which has a reduced portion 168 formed therein which is adapted to fit and slide in a slot 169 formed in a plate 170 mounted on a block 171 upon the plate 35 forming a part of the work support 32. The slot 169 is formed concentric with the center of the stud 120 and the pawl 164 is moved forward and backward upon the plate 170 by the rocking movement of the lever 119. The pawl 164 is prevented from moving vertically upon the plate 170 by shoulders 172 and 173 formed by the reduced portion 168 of the stem 167.

Figure 4:
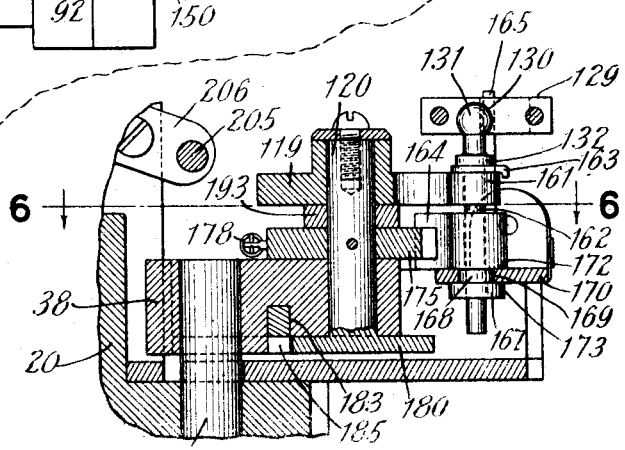
Fig. 4 is a detail section, partly in elevation, taken on line 4—4 of Fig. 2.

When the presser foot 38, together with the mechanism mounted thereon, is raised for the reasons previously stated the pawl 164 will remain stationary, the portion 162 of the pin 132 sliding vertically therein, as illustrated in Fig. 4. The pawl 164 engages the teeth 174 of a ratchet 175, and the spring 166, pulling upon the lever 163 which, in turn, is engaging the pin 165, normally tends to keep the pawl 164 in engagement with the teeth 174. The ratchet 175 is fast to the stud 120 and has a series of holes 1, 2, 3 and 4 therein arranged concentric with the center of said stud.

A setting pin 177 may be placed in any one of said holes and a coil spring 178 fast at one end to the frame 20 and at the other end to a pin inserted in the periphery of the ratchet 175 normally tends to pull the setting pin 177 toward and against a stop formed by the side of the presser foot 38.

Formed integral with the stud 120 at its lower end is a contact member 180 which has a portion of its periphery cut away at 181, consequently forming a tooth 182, Fig. 3. The under surface of the contact member 180 is flush with the under surface of the presser foot 38. Inserted in a groove 183 in the under surface of the presser foot is a slide 184 which has a projection 185 formed on its under side, Figs. 3, 4, 6 and 7. The tooth 182 is adapted to engage the projection 185 and move the slide 184 in the position illustrated in Fig. 3.

A lever 187 is pivoted at 188 in a recess 189 formed in the under side of the presser foot 38, the under surface of the lever 187 being flush with the under surface of the presser foot. One end of the lever 187 projects into a recess 190 formed in the under side of the slide 184 and the other end of said lever projects into a recess 191 formed in the under side of the secondary cutter 150, Figs. 3 and 11. The slide 184 is held in the groove 183 by the lever 187 projecting into the recess 190 at one end of said slide and by a plate 192 which supports the other end of said slide.

When the slide 184 is moved in the slot 183 by the contact member 180, the lever 187 is rocked upon its pivot 188, thereby moving the secondary cutter 150 transversely of the primary cutter 147 into the position illustrated in Fig. 11. This transverse movement of the secondary cutter 150 will move the groove 156 out from beneath the reinforcing strip 96, which is projecting through the slot 154, so that the inclined cutting edge 155 will extend entirely across the strip 96, and upon the next upward movement of the presser foot 38 the reinforcing strip will be entirely severed, as illustrated in Fig. 11.

Loosely mounted upon the stud 120 is a latch 193 normally held in the position illustrated in Fig. 2 by a coil spring 194 which is fast at one end to the frame 20 and at the other end to an arm 195 formed on said latch. The latch 193 also has an arm 196 with a notch 197 in its outer end. A pin 198, projecting upwardly from the ratchet 175, is adapted to engage the arm 196 at certain times in the operation of the mechanism and rotate said latch upon the stud 120.

A locking pawl 199 is pivoted at 200 upon the block 171 and is adapted to engage the teeth 174 of the ratchet 175. A flat spring 201 normally holds the pawl 199 against a stop pin 202 and in engagement with the teeth 174 to hold the ratchet 175 against rotation thereof by the spring 178, while the pawl 164 is moving backward to engage another tooth.

Before starting the machine to set hooks in the upper and in the reinforcing strip, the operator inserts the pin 177 in one of the holes 1, 2, 3 or 4 in the ratchet 175, for example, if he desires to set six hooks before the reinforcing strip is entirely severed, he places the pin 177 in the hole 1. If he desires to set five hooks before severing the strip, he places the pin in the hole 2; if he desires to set four hooks, he places the pin in the hole 3 and if he desires to set three hooks, he places the pin in the hole 4.

In the drawings, see Fig. 2, the pin is placed in the hole 1 and is held against the side of the presser foot 38 by the spring 178. The mechanism herein illustrated is arranged to set not less than three nor more than six hooks before the final severing operation takes place. The tooth 182 on the contact member 180 will be positioned relatively to the projection 185 on the slide 184 to engage said projection at the proper time to move said slide and thereby move the secondary cutter. The mechanism for automatically stopping the machine after a predetermined number of lacing hooks have been inserted in the upper is as follows:

Referring to Figs. 1, 2, 6, 7, 12 and 13, a rod 205 is mounted upon the frame 20 and is slidable horizontally in bearings 206 and 207. The rod at its front end is bent downwardly at 208 in order that it may be engaged by the arm 195 of the latch 193 at the proper time, and thereby be moved from the position illustrated in Fig. 6 to that illustrated in Fig. 7. The other end of the rod 205 is connected by a pin 209 to an arm 210 fast to a rock-shaft 211 mounted in bearings 212 at the rear of the machine.

A second arm 213 is fastened to the rock-shaft 211 and has pivoted thereto at 214 the downwardly extending arm 28 previously referred to. The arm 28 at its lower free end is adapted to be interposed between an upwardly extending arm 217 of the lever 26 and the pin 29 forming a part of the slide 30 and when so interposed it will be seen that the lower portion of said arm 28 constitutes a connecting member between the manually operated actuating member 26 and the tripper slide 30. Another arm 218 of the lever 26 is engaged by an extension 219 on the arm 39, against which it is normally held by a spring 220 except when the rod 25 and arm 39 are raised to lift the presser foot 38, at which time the movement of the lever 26 will be limited by the arm 218 engaging the end of a slot 221 through which said arm projects.

Figures 6, 7:
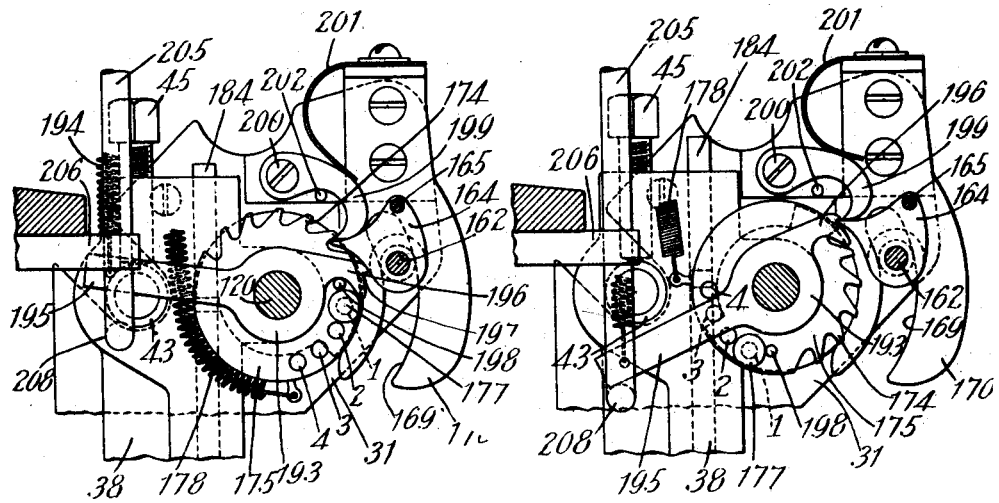
Figs. 6 and 7 are detail sectional plan views taken on line 6—6 of Fig. 4.

A spring 222 normally tends to hold the arm 28 in engagement with the arm 217, as illustrated in Fig. 12, at which time the end 208 of the rod 205 will be in the position illustrated in Figs. 2 and 6. A spring plate 223, pivoted at 224 upon the inside of the frame 20, has fast thereto a stud 225 which projects through an opening 226 in the frame 20, said stud having mounted thereon a spring 227 which bears at one end against the frame 20 and at the other end against an adjusting screw 228 upon said stud.

The spring plate 223, at its lower end, bears against one end of the tripper slide 30 and always tends to push said tripper slide toward the left, Fig. 12, and into a position to engage the locking dog 24, thereby stopping the machine. The pin 29 fast to the tripper slide 30, projects through an opening in the frame 20 and engages the lower end of the swinging arm 28. A stop pin 229 limits the movement of the arm 28 and the tripper slide 30 toward the left, Fig. 12, while contact of the arm with the frame at 230 limits the movement of said arm and slide toward the right.

Figure 17:
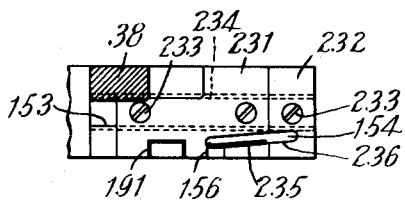
Fig. 17 is a detail view illustrating a modified construction of the secondary cutter.
Figure 16:
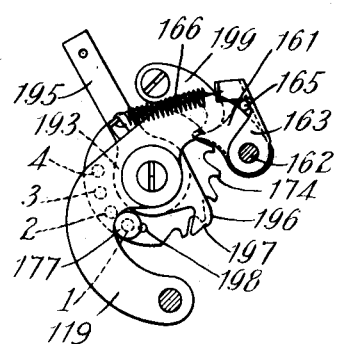
Fig. 16 is a detail plan view partly in section of a portion of the mechanism for adjusting the secondary cutter, whereby the strip of reinforcing material is completely severed after the setting of a predetermined number of lacing hooks.

In Fig. 17 an alternate construction is illustrated for the secondary cutter in which said cutter is shown formed in two parts 231 and 232, said parts being fastened by screws 233 to a dovetailed shaped cleat 234 adapted to slide in the groove 153 in the presser foot 38. The cutter 231 has a cutting edge 235 and the cutter 232 has a cutting edge 236. The cutting edge 235 contacts with the reinforcing strip to partially sever said strip while the cutting edge 236 coöperates with the cutting edge 235 to entirely sever said strip during the final severing operation. The inclined slot 154, vertical groove 156 and slot 191 are similar to the corresponding parts of the secondary cutter of the preferred construction and perform the same functions.

The general operation of the mechanism hereinbefore described is as follows: Assuming that the punch 53 is in the position illustrated in Fig. 10, the clutch controlling mechanism in the position illustrated in Fig. 12 and the strip feeding mechanism in the position illustrated in Fig. 2 with the reinforcing strip 96 having been fed forward so that the end thereof projects beneath the punch, the operator presses the treadle in the proper direction to raise the rod 25 and through the arm 39, rock shaft 40 and arm 42, lift the rod 43 and thus raise the presser foot 38. The upper 31 is then placed upon the work support 32 with its front edge resting against the edge gage 33, the treadle is released and the presser foot descends and is operated to clamp the upper to the work-support by the spring 46.

The reinforcing strip 96 is directed by the guide 97 to the presser foot 38 beneath the finger 103 with its inner surface facing down and resting upon a shelf 101 of the presser foot 38 passing through an opening 102 in the presser foot thence through the inclined slot 154 of the secondary cutter 150 and into position under the punch 53.

After the upper 31 has been clamped upon the work support the operator rocks the treadle in the proper direction to lower the rod 25 and thereby rocks the lever 26 and arm 28, whereupon the tripper slide 30 will be withdrawn from in front of the locking dog 24, allowing said locking dog to engage the driving pulley 22 and start the machine. The punch 53 immediately descends and coacting with the die plate 78 punches a hole in the reinforcing strip 96 and the upper 31. The vertical movement is imparted to the punch by the plunger 58, crank arm 60, rock shaft 61, arm 68, and link 67, said link receiving a substantially vertical movement from cams 70 and 71 fast to the main driving shaft 21.

The primary cutter 147 being mounted upon the punch the stud 54 descends with the punch. As the link 67 descends the bell crank lever 122 will rock in the direction of the arrow a, Fig. 2, and through the connecting rod 121, will rock the lever 119 and thereby cause the pawl 174 to move a sufficient distance to engage the next tooth in the ratchet 175. The same rocking movement of the lever 119 will cause the finger 103 to draw back over the reinforcing strip, said strip being held firmly between the guide 97 and the cover plate 98.

A lacing hook 84 having been released from the raceway, fed down the auxiliary raceway 90 and upon the lacing hook carrier plate 91, the lacing hook carrier slide 83 commences to rise, the die plate 78 withdraws from under the punch 53, the punch then descends slightly and as the shank of the lacing hook 84 is forced through the upper 31 and reinforcing strip 96 the anvil 55 will crimp over the shank of the lacing hook and clench the hook in the material as illustrated in Fig. 8. As the punch descends, the cutting edge 151 of the primary cutter 147 will be brought down against the upper surface of the reinforcing strip 96 but will not cut the strip. The punch 53 will now be raised very slightly to release the pressure upon the lacing hook and to allow the lacing hook carrier plate 91 to be withdrawn from the hook 84 whereupon the presser foot 38 will be automatically raised to release the upper in order that the upper may be fed forward. The presser foot is automatically raised by the cam 50, the lever 47 and rod 43.

As the presser foot rises it carries with it the secondary cutter 150 and as the cutting edge of said cutter extends only partly across and beneath the reinforcing strip 96 it will only partially sever said reinforcing strip 96 as illustrated in Fig. 5 at 157.

While I have illustrated and described the partial severing operation as taking place during the upward movement of the presser foot after the lacing hook has been inserted in the material, by adjusting the block 145 which carries the primary cutter 147 upon the stud 54, the primary cutter may be so positioned that the partial severing operation may take place during the downward movement of the punch or practically simultaneously with the crimping of the shank of the lacing hook.

The punch 53 still in engagement with the shank of the lacing hook 84 is moved laterally thus feeding the upper and pulling with said upper the reinforcing strip, as illustrated in Fig. 9. The lateral movement is imparted to the punch 53 through the slide 56, arm 72, rock shaft 75 and arm 77 from the main driving shaft 21.

During the feeding of the upper 31 the lacing hook carrier slide 83 descends to its original position and at the termination of the feeding movement the presser foot also descends and again clamps the upper. The punch now moves upwardly out of the lacing hook and then laterally to its first position.

Simultaneously with the lateral movement of the punch at which time the link 67 is moving upwardly, the lever 122 is rocked in the reverse direction to that indicated by the arrow a, Fig. 2, and thereby through the connecting rod 121, lever 119 and pawl 164, the ratchet 175 will be moved forward one tooth and the contact member 180 will also be moved correspondingly so that the distance between the tooth 182 and the projection 185 on the slide 184 will be decreased.

The cycle of operations is then repeated, the reinforcing strip being partially severed between each successive hook as illustrated in Fig. 5. The edge 159 of the upper being held against the edge gage 33, the edge 160 of the reinforcing strip will easily conform to the curve of the upper without wrinkling, the slits 157 spreading as indicated in Fig. 5, according to the degree of the curve of the upper.

With each successive rocking movement of the lever 119 the pawl 164 will feed the ratchet 175 forward one tooth and the locking pawl 199 will hold said ratchet in its advanced position against the tension of the spring 178 while the pawl 164 is returning to engage a new tooth.

It is evident that as the ratchet 175 is thus advanced the tooth 182 and contact member 180 will continue to advance toward the projection 185 on the slide 184 until just previous to the setting of the final hook the tooth 182 will engage said projection 185 on the slide 184 and move said slide in the direction of the arrow b, Fig. 3, rocking the lever 187 upon the pivot 188 and thereby move the secondary cutter 150 into the position illustrated in Fig. 11, in which the cutting edge of said cutter will extend entirely across the reinforcing strip ready to entirely sever said strip.

After the final lacing hook has been inserted in the upper the presser foot will rise as usual and this time the reinforcing strip will be entirely severed. The upper, after the severing of said strip, will be fed forward as usual by the punch, but the strip now being entirely severed, cannot be moved forward by said punch and therefore the initial feeding movement of the strip is accomplished by means of the finger 103 which will be fed forward with its point penetrating the strip and giving to said strip its initial feeding movement for the succeeding upper.

It will be understood that as the ratchet 175 is rotated step by step as hereinbefore described it will eventually arrive at the position illustrated in Fig. 6, and the latch 193 will be moved from the position illustrated in Fig. 2 to that illustrated in Fig. 6 by the pin 198, which being fastened to the ratchet 175 will be carried by said ratchet into engagement with said latch and thus said latch will be moved to the position illustrated in Fig. 6.

In the position illustrated in Fig. 6 it will be seen that the ratchet is held against rotation by the locking pawl 199 and at this time the secondary cutter will be in position to entirely sever the strip, the pawl 164 will will now be moved backwardly until the end thereof engages the latch 193 which will operate to throw said pawl out of engagement with the ratchet; then upon the next forward movement of the pawl 164 said latch will be moved to the position illustrated in Fig. 7.

The pawl 164 will now engage pawl 199 and throw it out of engagement with the ratchet 175 and said ratchet will then be carried back by the spring 178 from the position illustrated in Fig. 6 to that illustrated in Fig. 7 and will be stopped by the pin 177 coming in contact with the side of the presser foot. The contact member 180 will also be carried back to the position illustrated in Fig. 7.

Pawls 164 and 199 and the latch 193 will now be in the position illustrated in Fig. 7 and the tooth 182 having been withdrawn from contact with the projection 185, the slide 184, lever 187 and secondary cutter 151 will also return to the positions they formerly occupied, as illustrated in Fig. 3.

During the latter part of the last forward movement of the pawl 164 which carries the latch 193 from the position illustrated in Fig. 6 to that illustrated in Fig. 7, the arm 195 will engage the downwardly turned end 208 of the rod 205 and move said rod in the direction of the arrow c, Fig. 2, thereby rocking the shaft 211 and raising the arm 28. This upward movement of the arm 28 will disengage the lower end of said arm from the arm 217 of the lever 26 thereby releasing the spring actuated tripper slide 30 and allowing said tripper slide to be engaged by the locking dog 24, whereupon the driven member 23 of the clutch will be disengaged from the driving pulley member 22 and the machine will stop automatically without the operator removing his foot from the treadle. The operator may stop the machine if he so desires at the completion of each lacing hook setting operation by removing his foot from the treadle, which will cause the rod 25 to rise and thereby allow the parts to assume the positions illustrated in Fig. 12.

The machine having been automatically stopped the operator now rocks the treadle and raises the presser foot 38 to remove the upper, but this time the presser foot must be raised a sufficient distance to disengage the latch 193 from the pawl 164, whereupon the pawls 164 and 199 will return to the positions illustrated in Fig. 2 and the machine is now ready for the lacing hook to be set in the next upper.

It will thus be seen that by means of the mechanism hereinbefore described that a predetermined number of lacing hooks may be inserted in a shoe upper and in a reinforcing strip in such a manner as to reinforce the upper by the reinforcing strip so attached thereto by the lacing hooks that it will not be wrinkled or rendered less pliable and yielding by reason of said reinforcing strip, and after the last lacing hook has been inserted in the upper the machine will be automatically stopped.

While it is desirable to partially sever the reinforcing strip between each pair of lacing hooks as previously described, it is not absolutely necessary in some classes of work, and in such cases it is only necessary to adjust the block 145 which carries the primary cutter upon the stud 54 so that said cutter will not be able to coöperate with the secondary cutter during the usual lacing hook setting operations, but said primary cutter will be in a position to coöperate with the secondary cutter to entirely sever the strip during the final upward movement of the presser foot after the last hook has been set. Aside from the fact that the cutters will not coöperate to partially sever the reinforcing strip, all other parts of the machine will perform their usual functions and the machine will be atuomatically stopped as previously described.

When it is desired to operate the machine to set lacing studs in an upper without the use of the reinforcing strip, it is only necessary to remove the reinforcing strip so that it will not be engaged by the finger 103, and when the finger 103 is thus prevented from feeding the reinforcing strip the cutters will necessarily perform no function, but all other parts of the machine will perform their usual functions, as the lacing hooks will be set, the upper will be fed and the machine will be automatically stopped as hereinbefore described.

In case a lacing hook becomes jammed or is not properly clenched or, if, for any other reason, it is desired to set a single lacing hook with the machine of this invention, it may be done by operating the treadle to raise the presser foot and the operator having inserted the upper in the proper position, the treadle is then operated to lower the presser foot and further operated to depress the rod 25, thus operating the lever 26 and through the connecting member 28 and pin 29 the tripper slide 30 will be moved out of engagement with the locking dog 24 and the clutch will then operate the machine to set a lacing hook. At the completion of the setting operation of one lacing hook the operator releases the treadle, whereupon the rod 25 will move upwardly and the lever 26 being thus released the tripper slide will be moved toward the left, Fig. 12, by the spring 223 until it is engaged by the dog 24, whereupon the driving member 22 of the clutch will be disengaged from the driven member 23 and the machine will be stopped.

If it is desired to attach the lacing hooks to the uppers by separate sections and to automatically stop the machine after a predetermined number of lacing hooks have been set, it may be accomplished by the machine hereinbefore described and, furthermore, a saving in the amount of material used for the reinforcing pieces may be effected by reason of the fact that the mechanism for feeding the tape is independent of the mechanism which feeds the upper.

Figure 18:
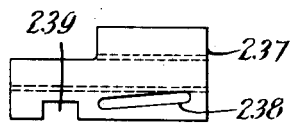
Fig. 18 is a detail front elevation of a modified form of secondary cutter.
Figure 19:
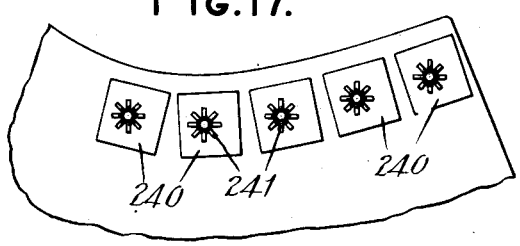
Fig. 19 is a view of a portion of the inner side of a shoe upper showing the strip entirely severed at intervals with spaces between the separate sections of reinforcing strip.

To accomplish this result and perform the work illustrated in Fig. 19, it is only necessary to substitute for the secondary cutter 150 another cutter 237, Fig. 18. This cutter is provided with a slot 238 through which the reinforcing tape is fed and is also provided with a slot 239 into which the end of the lever 187 projects. It will be seen that this cutter 237 is a duplicate of the cutter 150 except that it does not contain the vertical groove 156 and, therefore, when using this cutter 237 the tape will be entirely severed between adjacent lacing hooks and at the end of the setting of a predetermined number of lacing hooks, instead of being partly severed between adjacent lacing hooks and entirely severed at the end of the setting of a predetermined number of lacing hooks, as would be the case when the cutter 150 is used.

The tape in this embodiment of my invention, instead of being fed by the punch, will be fed prior to the punching of the tape and prior to the setting of each of the lacing hooks in the tape, by the finger 103 and its actuating mechanism hereinbefore specifically described. In other words, the strip will be given an initial feeding movement each time by the strip feeding mechanism. Otherwise, the machine will operate as hereinbefore described.

Since the feeding mechanism for the tape is entirely independent of the feeding mechanism for the upper, it is evident that a sufficient feed may be imparted to the tape to provide a section 240 (Fig. 19) of sufficient size to firmly anchor the lacing hook in the upper and these sections would be of the same length independent of the distance between the lacing hooks 241, so that a great saving in the reinforcing strip of material is effected.

In adapting the machine to perform the work illustrated in Fig. 19, the machine is automatically stopped at the end of a predetermined number of lacing hook setting operations, as hereinbefore described.

Having thus described my invention, what I claim and desire by Letters Patent to secure is:

1. A lacing stud setting machine having, in combination, means for setting a lacing stud in a shoe upper and in a piece of reinforcing material, mechanism for cutting said piece of reinforcing material from a strip of the same and mechanism including said cutting mechanism for automatically stopping the machine after said setting operation.

2. A lacing stud setting machine having, in combination, mechanism for setting a plurality of studs in a shoe upper and in a reinforcing strip of material, mechanism for cutting said reinforcing strip and mechanism including said cutting mechanism for automatically stopping said machine after a predetermined number of stud setting operations.

3. A lacing stud setting machine having, in combination, mechanism for setting a plurality of studs in a shoe upper and in a strip of reinforcing material therefor, mechanism adapted to sever the portion of said strip in which said lacing studs have been set from the remainder of said strip and mechanism including said severing mechanism adapted to automatically stop said machine after a predetermined number of stud setting operations.

4. A lacing stud setting machine having, in combination, mechanism to feed a strip of reinforcing material to a shoe upper, mechanism adapted to set a plurality of studs in said upper and strip, mechanism adapted to cut said strip and mechanism including said cutting mechanism adapted to automatically stop said machine after a predetermined number of stud setting operations.

5. A lacing stud setting machine having, in combination, mechanism adapted to set a predetermined number of studs in a shoe upper and in a strip of reinforcing material, mechanism adapted to impart a step by step movement to said upper and strip, mechanism adapted to cut said strip and mechanism including said cutting mechanism adapted to automatically stop said machine after a predetermined number of stud setting operations.

6. A lacing stud setting machine having, in combination, mechanism adapted to set a predetermined number of studs in a shoe upper and in a reinforcing strip therefor, mechanism adapted to sever the portion of said strip in which a predetermined number of studs have been set from the remainder of said strip and mechanism including said severing mechanism adapted to automatically stop said machine after a predetermined number of stud setting operations.

7. A lacing stud setting machine having, in combination, mechanism adapted to cut a piece of reinforcing material transversely thereof at intervals, mechanism adapted to set studs in a shoe upper and in said reinforcing material between said cuts, and mechanism including said cutting mechanism adapted to automatically stop said machine after a predetermined number of setting operations.

8. A lacing stud setting machine having, in combination, mechanism adapted to cut a piece of reinforcing material transversely thereof at intervals, mechanism adapted to set studs in a shoe upper and in said reinforcing material between said cuts, means to feed said strip and upper whereby said studs may be spaced, and mechanism including said cutting mechanism adapted to automatically stop said machine after a predetermined number of setting operations.

9. A lacing stud setting machine having, in combination, mechanism for setting studs in an upper and in a reinforcing strip, mechanism for slitting said strip transversely thereof and partly thereacross at intervals, and mechanism including said slitting mechanism for automatically stopping said machine after a predetermined number of setting operations.

10. A lacing stud setting machine having, in combination, mechanism for setting studs in an upper and in a reinforcing strip therefor, means for slitting said strip transversely thereof and partly thereacross a predetermined number of times, including mechanism for finally entirely severaing said strip and mechanism operated by said last named mechanism for automatically stopping said machine at the end of a predetermined number of setting operations.

11. In a machine of the character described, means for advancing a reinforcing strip to be attached to the work, mechanism adapted to operate a cutter to partially sever the strip at intervals and to completely sever the strip after a predetermined number of partially severing operations, means for setting studs through the partially severed sections and the work and mechanism including said cutter operating mechanism to automatically stop said machine after a predetermined number of stud setting operations.

12. In a machine of the character described, means for advancing a reinforcing strip to be attached to the work, a cutter for partially severing the strip at intervals, mechanism for automatically adjusting the cutter to completely sever the strip after a predetermined number of partially severing operations, means for setting studs through the partially severed sections and the work, and mechanism including said cutter adjusting mechanism to automatically stop said machine after a predetermined number of stud setting operations.

13. In a lacing stud setting machine, feeding means for advancing the work and a reinforcing strip simultaneously step by step to receive a stud through both, a cutter for partially severing the strip at intervals as advanced, mechanism for adjusting the cutter to completely sever the strip after a predetermined number of stud setting operations and mechanism including said cutter adjusting mechanism to automatically stop said machine after a predetermined number of stud setting operations.

14. In a lacing stud setting machine, feeding means for advancing the work and a reinforcing strip step by step to receive a stud through both, a strip cutter adapted to partially sever the strip at intervals, mechanism for controlling the effective cutting length of said cutter to completely sever the strip after a predetermined number of partially severing operations, and mechanism operated by said cutter controlling mechanism to automatically stop said machine after a predetermined number of stud setting operations.

15. In a lacing stud setting machine, means for advancing a reinforcing strip step by step to be attached to the work, a cutter having a plurality of blades, mechanism for adjusting said blades to partially sever the strip at intervals and completely sever the strip after a predetermined number of partially severing operations and mechanism operated by said blade adjusting mechanism to automatically stop said machine after a predetermined number of stud setting operations.

16. In a lacing stud setting machine, means for setting studs, means for causing said setting means to feed a continuous reinforcing strip with a shoe upper and automatically set a predetermined number of studs through both, mechanism whereby the strip may be partly severed and mechanism including said strip severing mechanism to automatically stop said machine after a predetermined number of stud setting operations.

17. In a lacing stud setting machine, means for feeding the work and a reinforcing strip an equal distance and simultaneously, means for automatically setting a predetermined number of studs through both the strip and the work, for attaching the two together, mechanism whereby the strip may be partly severed transversely at intervals and mechanism including said strip severing mechanism to automatically stop said machine after a predetermined number of stud setting operations.

18. A lacing stud setting machine having, in combination, means for setting a series of lacing studs in the upper of a boot or shoe and in a reinforcing strip therefor, said setting means embodying a punch adapted to pierce a hole in said upper and reinforcing strip, mechanism adapted to move said punch laterally thereof to feed said upper and reinforcing strip, mechanism for partially severing said strip between adjacent studs and for automatically entirely severing from said strip the portion thereof which has been attached to said upper by said studs and mechanism including said severing mechanism to automatically stop said machine after a predetermined number of stud setting operations.

19. A lacing stud setting machine having, in combination, means for setting a series of lacing studs in the upper of a boot or shoe and in a reinforcing strip therefor, said setting means embodying a punch adapted to pierce a hole in said upper and reinforcing strip, mechanism adapted to move said punch laterally thereof to feed said upper and reinforcing strip, mechanism for automatically severing from said strip the portion thereof which has been attached to said upper by said studs and mechanism including said severing mechanism to automatically stop said machine after a predetermined number of stud setting operations.

20. A lacing stud setting machine having, in combination, means for imparting an initial feeding movement to a reinforcing strip, means for setting a series of studs in the upper of a boot or shoe and in said reinforcing strip, said setting means embodying a punch adapted to pierce a hole in said upper and reinforcing strip, mechanism adapted to move said punch laterally thereof to feed said upper and reinforcing strip, mechanism for partially severing said strip between adjacent studs and for entirely severing from said strip the portion thereof which has been attached to said upper by said studs and mechanism including said severing mechanism to automatically stop said machine after a predetermined number of stud setting operations.

21. A lacing stud setting machine having, in combination, means for setting a lacing stud in the upper of a boot or shoe and in a reinforcing strip therefor, a primary and a secondary cutter, means to impart an intermittent feeding movement to said strip, instrumentalities embodying a pawl and ratchet mechanism and a contact member, adapted to move one of said cutters transversely of the other of said cutters at the end of a predetermined number of feeding movements of said strip, and means operated by said pawl and ratchet mechanism adapted to stop said machine at the end of a predetermined number of stud setting operations.

22. A lacing stud setting machine having, in combination, means for setting a lacing stud in the upper of a boot or shoe and in a reinforcing strip therefor, a primary and a secondary cutter, means to impart an intermittent feeding movement to said strip, instrumentalities embodying a pawl and ratchet mechanism and a contact member, adapted to move one of said cutters transversely of the other of said cutters at the end of a predetermined number of feeding movements of said strip, means to set said contact member in different positions relatively to a portion of said instrumentalities, whereby a varying number of movements of said contact member may take place before said secondary cutter is moved, and means operated by said pawl and ratchet mechanism adapted to stop said machine at the end of a predetermined number of stud setting operations.

23. A lacing stud setting machine having, in combination, means for setting a lacing stud in the upper of a boot or shoe and in a reinforcing strip therefor, a primary cutter adapted to be moved vertically to contact with said reinforcing strip, a secondary cutter adapted to coact with said primary cutter and having a cutting edge extending only partly across said reinforcing strip, means to impart a vertical reciprocatory motion to said secondary cutter, mechanism adapted to move said secondary cutter longitudinally of its cutting edge, whereby a portion of said reinforcing strip may be partly severed therefrom or entirely severed therefrom, and means operated by said last named mechanism adapted to stop said machine after a predetermined number of setting operations.

24. A lacing stud setting machine having, in combination, means for setting a lacing stud in the upper of a boot or shoe and in a reinforcing strip therefor, a primary cutter adapted to move vertically to contact with said reinforcing strip, a secondary cutter adapted to coact with said primary cutter and having a cutting edge extending only partly across said reinforcing strip, a presser foot upon which said secondary cutter is slidably mounted, means to intermittently raise and lower said presser foot, mechanism adapted to move said secondary cutter longitudinally of its cutting edge on said presser foot, whereby a portion of said reinforcing strip may be partly severed therefrom or entirely severed therefrom and means operated by said last-named mechanism adapted to stop said machine after a predetermined number of setting operations.

25. A machine for setting a lacing stud in the upper of a boot or shoe having, in combination, means for setting a lacing stud in a shoe upper and in a piece of reinforcing material, means for cutting said piece of reinforcing material from a strip of the same, a rotary shaft, a clutch on said shaft, a spring actuated tripper adapted to engage said clutch and unlock it from said shaft, means to move said tripper out of engagement with said clutch comprising a manually operated actuating member and a connecting member adapted to be interposed between said actuating member and said tripper and means including said cutting means to automatically move said connecting member out from between said actuating member and said tripper, whereby said tripper may be released and allowed to engage said clutch to unlock it from said shaft and stop said machine.

26. A lacing stud setting machine having, in combination, means for setting a lacing stud in the upper of a boot or shoe and in a reinforcing strip therefor, a primary cutter adapted to be moved vertically to contact with and partially sever said reinforcing strip, a secondary cutter adapted to coact with said primary cutter to partially sever said reinforcing strip, the cutting edge of said secondary cutter being adapted to extend normally only partly across said reinforcing strip, mechanism adapted to move said secondary cutter longitudinally of its cutting edge, whereby a portion of said reinforcing strip may be entirely severed therefrom, and means operated by said last-named mechanism adapted to stop said machine after a predetermined number of setting operations.

27. A lacing stud setting machine, having, in combination, means for setting a lacing stud in the upper of a boot or shoe and in a reinforcing strip therefor, a primary cutter adapted to move vertically to contact with said reinforcing strip, a secondary cutter adapted to coact with said primary cutter and having a cutting edge adapted to extend normally only partly across said reinforcing strip, a presser foot upon which said secondary cutter is slidably mounted, means to intermittently raise and lower said presser foot, a ratchet and a lever rotatably mounted on said presser foot, a pawl connected to said lever adapted to engage said ratchet, means to rock said lever, a contact member fast to said ratchet, mechanism operated by said contact member adapted to move said secondary cutter longitudinally of its cutting edge on said presser foot, whereby a portion of said reinforcing strip may be partly severed therefrom or entirely severed therefrom, and means operated by said last-named mechanism adapted to stop said machine after a predetermined number of setting operations.

28. A lacing stud setting machine having, in combination, means for setting a lacing stud in the upper of a boot or shoe and in a reinforcing strip therefor, a primary cutter adapted to move vertically to contact with said reinforcing strip, a secondary cutter adapted to coact with said primary cutter and having a cutting edge adapted to extend normally only partly across said reinforcing strip, a presser foot upon which said secondary cutter is slidably mounted, means to intermittently raise and lower said presser foot, a ratchet and a lever rotatably mounted on said presser foot, a pawl connected to said lever adapted to engage said ratchet, means to rock said lever whereby said ratchet may be rotated in one direction, a spring adapted to rotate said ratchet in the opposite direction, a locking pawl adapted to hold said ratchet against the action of said spring, a contact member fast to said ratchet, mechanism operated by said contact member adapted to move said secondary cutter longitudinally of its cutting edge on said presser foot, whereby a portion of said reinforcing strip may be partly severed therefrom or entirely severed therefrom, and means operated by said first named pawl adapted to stop said machine after a predetermined number of setting operations.

29. A lacing stud setting machine having, in combination, means for setting a lacing stud in the upper of a boot or shoe and in a reinforcing strip therefor, a primary cutter adapted to be moved vertically to contact with said reinforcing strip, a secondary cutter adapted to coact with said primary cutter and having a cutting edge adapted to extend normally only partly across said reinforcing strip, a presser foot upon which said secondary cutter is slidably mounted, means to intermittently raise and lower said presser foot, a ratchet and a lever rotatably mounted on said presser foot, a pawl connected to said lever adapted to engage said ratchet, means to rock said lever whereby said ratchet may be rotated in one direction, a spring adapted to rotate said ratchet in the opposite direction, a locking pawl adapted to hold said ratchet against the action of said spring, mechanism operated by said contact member adapted to move said secondary cutter longitudinally of its cutting edge on said presser foot, whereby a portion of said reinforcing strip may be partly severed therefrom or entirely severed therefrom, a stop pin fast to said ratchet adapted to engage said presser foot and locate said contact member relatively to said secondary cutter operating mechanism and means operated by said first named pawl to stop said machine after a predetermined number of setting operations.

30. A lacing stud setting machine having, in combination, means for setting a lacing stud in the upper of a boot or shoe and in a reinforcing strip therefor, a primary cutter adapted to be moved vertically to contact with said reinforcing strip, a secondary cutter adapted to coact with said primary cutter and having a cutting edge adapted to extend normally only partly across said reinforcing strip, a presser foot upon which said secondary cutter is slidably mounted, means to intermittently raise and lower said presser foot, a ratchet and a lever rotatably mounted on said presser foot, a pawl connected to said lever adapted to engage said ratchet, means to rock said lever whereby said ratchet may be rotated in one direction, a spring adapted to rotate said ratchet in the opposite direction, a locking pawl adapted to hold said ratchet against the action of said spring, mechanism operated by said contact member adapted to move said secondary cutter longitudinally of its cutting edge on said presser foot, whereby a portion of said reinforcing strip may be partly severed therefrom or entirely severed therefrom, a stop pin fast to said ratchet adapted to engage said presser foot and locate said contact member relatively to said secondary cutter operating mechanism, said stop pin being adjustably fastened to said ratchet whereby a varying number of movements of said contact member may take place before said secondary cutter is moved longitudinally of its cutting edge, and means operated by said first named pawl adapted to stop said machine after a predetermined number of setting operations.

31. A lacing hook setting machine having, in combination, means for setting a lacing hook in the upper of a boot or shoe and in a reinforcing strip therefor, a primary and a secondary cutter, a presser foot upon which said secondary cutter is slidably mounted, means to intermittently raise and lower said presser foot, mechanism adapted to move said secondary cutter longitudinally of its cutting edge, said mechanism including a ratchet, a contact member rotatably mounted upon said presser foot, mechanism adapted to impart a rotary motion to said ratchet and contact member in one direction, comprising a lever, a pawl adapted to engage the teeth of said ratchet and means to rock said lever, said pawl being slidably mounted upon a stationary support and having sliding engagement with said lever, a spring adapted to rotate said ratchet in the opposite direction, a locking pawl mounted upon a stationary support and adapted to engage the teeth of said ratchet and a latch rotatably mounted upon said presser foot concentric with said ratchet, said latch having a tooth thereon adapted to be engaged by said pawl, whereby said pawl may be thrown out of engagement with said ratchet, and means operated by said latch adapted to stop said machine after a predetermined number of setting operations.

32. A lacing hook setting machine having, in combination, means for setting a lacing hook in the upper of a boot or shoe and in a reinforcing strip therefor, a primary and a secondary cutter, a presser foot upon which said secondary cutter is slidably mounted, means to intermittently raise and lower said presser foot, mechanism adapted to move said secondary cutter longitudinally of its cutting edge, said mechanism including a ratchet, a contact member rotatably mounted upon said presser foot, mechanism to impart a rotary motion to said ratchet and contact member comprising a lever, a pawl adapted to engage the teeth of said ratchet and means to rock said lever, said pawl being slidably mounted upon a stationary support and having sliding engagement with said lever, a spring adapted to rotate said ratchet in one direction, a locking pawl mounted upon a stationary support and adapted to engage the teeth of said ratchet, a latch rotatably mounted upon said presser foot concentric with said ratchet, said latch having a tooth thereon adapted to be engaged by said pawl, whereby said pawl may be thrown out of engagement with said ratchet, said latch adapted to be subsequently disengaged from said pawl by an upward movement of said presser foot, and means operated by said latch adapted to stop said machine after a predetermined number of setting operations.

33. A lacing hook setting machine having, in combination, means for setting lacing hooks in the upper of a boot or shoe and in a reinforcing strip therefor, a primary and a secondary cutter, a presser foot upon which said secondary cutter is mounted, means to intermittently cause said cutters to coöperate to partially sever said reinforcing strip, mechanism adapted to impart an intermittent feeding movement to said strip including a lever mounted upon said presser foot and means to impart a rocking movement to said lever, whereby a portion of said strip may be severed therefrom and another portion of said strip may be fed between said cutters, and means including said strip feeding mechanism adapted to stop said machine after a predetermined number of setting operations.

34. A lacing hook setting machine having, in combination, means for setting lacing hooks in the upper of a boot or shoe and in a reinforcing strip therefor, a primary and a secondary cutter, a presser foot upon which said secondary cutter is mounted, means to intermittently cause said cutters to coöperate to partially sever said reinforcing strip, a curved guide, a cover plate for said guide, mechanism adapted to impart an intermittent feeding movement to said strip between said curved guide and said cover plate, the face of said strip which is outermost when said strip is wound in a roll to be uppermost when said strip passes between said curved guide and said cover plate, a lever mounted upon said presser foot, means to impart a rocking movement to said lever, whereby a portion of said strip may be severed therefrom and another portion of said strip may be fed between said cutters, and means including said strip feeding mechanism adapted to stop said machine after a predetermined number of setting operations.

35. A machine for setting lacing studs in the upper of a boot or shoe and in a reinforcing section therefor having, in combination, means for setting a single stud in said upper and in a reinforcing strip, means for cutting a section in which said single stud is set from said strip, means to feed said upper step by step to space a plurality of studs and independent means to feed said strip.

36. A machine for setting lacing studs in the upper of a boot or shoe and in a reinforcing section therefor having, in combination, means for setting a stud in said upper and in a reinforcing strip, means for cutting a section in which said stud is set from said strip, means to feed said upper step by step to space said studs, independent means to feed said strip and means including said strip feeding means to automatically stop said machine after said cutting operation.

37. A machine for setting lacing studs in the upper of a boot or shoe and in a reinforcing section therefor having, in combination, means for setting a predetermined number of studs in said upper and in a reinforcing strip, means for cutting said strip entirely thereacross after each setting operation, means to feed said upper step by step to space said studs and independent means to feed said strip.

38. A machine for setting lacing studs in the upper of a boot or shoe and in a reinforcing section therefor having, in combination, means for setting a predetermined number of studs in said upper and in a reinforcing strip, means for cutting said strip entirely thereacross after each setting operation, means to feed said upper step by step to space said studs, independent means including said strip feeding means to feed said strip, and means to automatically stop said machine after a predetermined number of cutting operations.

39. In mechanism for applying lacing studs to shoe uppers, means for feeding an upper, means for feeding a reinforcing strip a distance substantially different from the feeding movement of the upper and means for applying studs and severed sections of said reinforcing strip to said upper.

40. In mechanism for applying lacing studs to shoe uppers, means for feeding an upper, means for feeding a reinforcing strip a distance substantially different from the feeding movement of the upper, means for applying studs and severed sections of said reinforcing strip to said upper and means including said strip feeding means to automatically stop said machine at the end of a predetermined number of stud setting operations.

41. In mechanism for applying lacing studs to shoe uppers, means for feeding an upper, independent feeding means for feeding a strip of reinforcing material a distance substantially different from the feeding movement of said upper and means for applying studs and sections of said strip to said upper.

42. In mechanism for applying lacing studs to shoe uppers, means for feeding an upper, independent feeding means for feeding a strip of reinforcing material a distance substantially different from the feeding movement of said upper, means for applying studs and sections of said strip to said upper, and means including said strip feeding means to automatically stop said machine at the end of a predetermined number of stud setting operations.

43. In mechanism for applying lacing studs to shoe uppers, means for imparting a feeding movement to the upper, independent means for simultaneously feeding a reinforcing strip a distance substantially different from the said feeding movement of the upper, means for cutting said strip into sections, and means for attaching the studs and said sections to the upper.

44. In mechanism for applying lacing studs to shoe uppers, means for imparting a feeding movement to the upper, independent means for simultaneously feeding a reinforcing strip a distance substantially different from the said feeding movement of the upper, means for cutting said strip into sections, means for attaching the studs and said sections to the upper, and means including said strip feeding means to automatically stop said machine at the end of a predetermined number of stud setting operations.

45. In mechanism for applying lacing studs to shoe uppers, means for imparting a step by step feeding movement to the upper, means for feeding a reinforcing strip a distance substantially different from the travel of each movement of said upper, means to secure studs to said upper and said strip and means for cutting the strip after each stud is applied.

46. In mechanism for applying lacing studs to shoe uppers, means for imparting a step by step feeding movement to the upper, means for feeding a reinforcing strip a distance substantially different from the travel of each movement of said upper, means to secure studs to said upper and said strip, means for cutting the strip after each stud is applied, and means including said strip feeding means to automatically stop said machine at the end of a predetermined number of stud setting operations.

47. In mechanism for applying lacing studs to shoe uppers, the combination of means for feeding a strip of reinforcing material, means for securing lacing studs to severed sections of said strip and the shoe upper, means for imparting a step by step movement to the upper, said strip and upper being fed substantially different distances, a gage against which the outer edge of the upper is held by said movement imparting means, the construction and arrangement being such that the studs and reinforcing material are applied to the upper in a line conforming to the outer edge thereof.

48. In mechanism for applying lacing studs to shoe uppers, the combination of means for feeding a strip of reinforcing material, means for securing lacing studs to severed sections of said strip and the shoe upper, means for imparting a step by step movement to the upper, said strip and upper being fed substantially different distances, a gage against which the outer edge of the upper is held by said movement imparting means, the construction and arrangement being such that the studs and reinforcing material are applied to the upper in a line conforming to the outer edge thereof, and means including said strip feeding means to automatically stop said machine at the end of a predetermined number of stud setting operations.

49. In a machine of the class described, the combination with means for setting lacing studs, of means for feeding a strip of reinforcing tape to a shoe upper, means for simultaneously imparting a feeding movement to the shoe upper substantially different from the feeding movement of the tape and means for simultaneously severing the strip and attaching the portion being severed to the upper.

50. In a machine of the class described, the combination, with means for setting lacing studs, of means for feeding a strip of reinforcing tape to a shoe upper, means for simultaneously imparting a feeding movement to the shoe upper substantially different from the feeding movement of the tape, means for simultaneously severing the strip and attaching the portion being severed to the upper, and means including said strip feeding means to automatically stop said machine at the end of a predetermined number of stud setting operations.

51. In a lacing stud setting machine, the combination, with means for setting studs, of means for feeding the work, independent feeding means for advancing a strip of reinforcing tape a distance substantially different from the feeding movement of the work, and means for cutting a plurality of lengths from said strip and securing the same in position on said upper by the setting of a stud in each of said lengths.

52. In a lacing stud setting machine, the combination, with means for setting studs, of means for feeding the work, independent feeding means for advancing a strip of reinforcing tape a distance substantially different from the feeding movement of the work, means for cutting a length from said strip and securing the same in position to said upper by the setting of a stud therein, and means including said strip feeding means to automatically stop said machine at the end of a predetermined number of stud setting operations.

53. In a lacing stud setting machine, the combination, with means for setting studs, of means for feeding the work and independent means for advancing a strip of reinforcing tape at each feeding operation a distance substantially different from the feeding movement of the work to be secured to the work by the setting of the studs therein.

54. In a lacing stud setting machine, the combination, with means for setting studs, of means for feeding the work independent means for advancing a strip of reinforcing tape a distance substantially different from the feeding movement of the work to be secured to the work by the setting of the studs therein, and means including said strip feeding means to automatically stop said machine at the end of a predetermined number of stud setting operations.

55. In a lacing stud setting machine, the combination, with means for setting the stud, of means for feeding the work, independent means for advancing a strip of reinforcing tape with the work to be connected thereto by the stud when set therein, means for severing a predetermined length of tape from the strip after securing it to the upper and a tension device for retaining the tape during the return movement of the feeding mechanism.

56. In a lacing stud setting machine, the combination, with means for setting the stud, of means for feeding the work, independent means for advancing a strip of reinforcing tape with the work to be connected thereto by the stud when set therein, means for severing a predetermined length of tape from the strip after securing it to the upper, a tension device for retaining the tape during the return movement of the feeding mechanism, and means including said strip feeding means to automatically stop said machine at the end of a predetermined number of stud setting operations.

57. In a lacing stud setting machine, the combination, with means for setting the studs in the work, of means for feeding the work, independent means for engaging and advancing a strip of reinforcing tape in unison with the work, said tape to support the upper about the stud when set therein and means for severing the tape as the same is applied to the upper.

58. In a lacing stud setting machine, the combination, with means for setting the studs in the work, of means for feeding the work, independent means for engaging and advancing a strip of reinforcing tape in unison with the work, said tape to support the upper about the stud when set therein, means for severing the tape as the same is applied to the upper, and means including said strip feeding means to automatically stop said machine at the end of a predetermined number of stud setting operations.

In testimony whereof I have hereunto set my hand in presence of two subscribing witnesses.

ARTHUR R. HAVENER.

Witnesses:
    FRANKLIN E. LOW,
    CHARLES S. GOODING.